US011419103B2

(12) United States Patent
Ljung

(10) Patent No.: US 11,419,103 B2
(45) Date of Patent: Aug. 16, 2022

(54) PRIORITIZATION METHOD FOR RADIO ACCESS TECHNOLOGIES USED FOR WIRELESS DATA COMMUNICATION

(71) Applicant: Sony Corporation, Tokyo (JP)

(72) Inventor: Rickard Ljung, Helsingborg (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/648,972

(22) PCT Filed: Sep. 5, 2018

(86) PCT No.: PCT/EP2018/073801
§ 371 (c)(1),
(2) Date: Mar. 19, 2020

(87) PCT Pub. No.: WO2019/063250
PCT Pub. Date: Apr. 4, 2019

(65) Prior Publication Data
US 2020/0288443 A1  Sep. 10, 2020

(30) Foreign Application Priority Data

Sep. 29, 2017  (SE) .................................. 1730268-8

(51) Int. Cl.
*H04W 72/04* (2009.01)
*H04W 48/16* (2009.01)

(52) U.S. Cl.
CPC ......... *H04W 72/042* (2013.01); *H04W 48/16* (2013.01); *H04W 72/0413* (2013.01)

(58) Field of Classification Search
CPC ........................... H04W 72/042; H04W 48/16; H04W 72/0413
See application file for complete search history.

(56) References Cited

U.S. PATENT DOCUMENTS

| 8,155,040 B2* | 4/2012 | Franklin | H04W 8/245 370/310 |
| 8,238,980 B1* | 8/2012 | Shusterman | H04W 52/0251 455/574 |
| 2004/0058679 A1* | 3/2004 | Dillinger | H04W 36/00835 455/439 |

(Continued)

OTHER PUBLICATIONS

Search Report for corresponding Swedish Application No. 1730268-8 dated Jun. 1, 2018, 2 pages.

(Continued)

*Primary Examiner* — Michael J Moore, Jr.
(74) *Attorney, Agent, or Firm* — Tucker Ellis LLP

(57) ABSTRACT

According to an embodiment, a method for use in a user equipment is disclosed. Hereby, the user equipment is adapted to communicate with a wireless network using a plurality of radio access technologies. According to this, the method comprises prioritizing at least one radio access technology from the plurality of radio access technologies. Further, the method also comprises transmitting uplink control signaling indicative of the prioritized at least one radio access technology to the wireless network. According to further embodiments, a method for use in a network node of a wireless network as well as respective first and second devices are disclosed.

24 Claims, 9 Drawing Sheets

(56) References Cited

U.S. PATENT DOCUMENTS

| | | | | |
|---|---|---|---|---|
| 2007/0230420 A1* | 10/2007 | Bumiller | H04W 48/18 | 370/338 |
| 2008/0176565 A1* | 7/2008 | Eerolainen | H04W 48/16 | 455/436 |
| 2010/0075665 A1* | 3/2010 | Nader | H04W 48/18 | 455/426.1 |
| 2010/0216468 A1* | 8/2010 | Kazmi | H04W 48/20 | 455/435.3 |
| 2011/0090790 A1* | 4/2011 | Bergqvist | H04W 36/24 | 370/252 |
| 2012/0289170 A1* | 11/2012 | Li | H04L 1/1854 | 455/73 |
| 2012/0302241 A1* | 11/2012 | Klingenbrunn | H04W 48/18 | 455/436 |
| 2013/0136115 A1* | 5/2013 | Moisanen | H04W 76/18 | 370/338 |
| 2013/0196663 A1* | 8/2013 | Yurkevich | H04W 8/183 | 455/435.3 |
| 2014/0162648 A1* | 6/2014 | Cui | H04W 48/04 | 455/435.3 |
| 2015/0271836 A1* | 9/2015 | Damnjanovic | H04W 72/06 | 370/329 |
| 2015/0334724 A1* | 11/2015 | Faccin | H04W 28/085 | 370/235 |
| 2015/0350953 A1 | 12/2015 | Himayat et al. | | |
| 2016/0127956 A1 | 5/2016 | Jujaray et al. | | |
| 2016/0345244 A1* | 11/2016 | Chuttani | H04W 48/16 | |
| 2016/0345334 A1* | 11/2016 | Veerepalli | H04L 67/306 | |
| 2017/0127325 A1* | 5/2017 | Vikberg | H04W 36/14 | |
| 2017/0359632 A1* | 12/2017 | Qu | H04W 36/18 | |
| 2018/0234916 A1* | 8/2018 | Song | H04W 48/18 | |
| 2019/0007730 A1* | 1/2019 | Fukuoka | H04N 21/43615 | |
| 2019/0069226 A1* | 2/2019 | Lee | H04W 48/18 | |
| 2019/0150082 A1* | 5/2019 | Kedalagudde | H04W 4/46 | 370/329 |
| 2020/0280827 A1* | 9/2020 | Fechtel | H04W 4/46 | |

OTHER PUBLICATIONS

European Office Action dated Oct. 20, 2021 for Application Serial No. 18765615.2.

International Search Report and Written Opinion from corresponding International Application No. PCT/EP2018/073801, dated Nov. 22, 2018, 12 pages.

Nokia et al: "UE capability structure and coordination aspects for MR-DC", 3GPP Draft; R2-1706859, Jun. 26, 2017, 14 pages.

Nokia et al: "Smarter UE/5G device", 3GPP Draft; S1-171391R1, Feb. 13, 2017, 22 pages.

Ericsson: "Mobility between LTE and NR for inactive UEs", 3GPP Draft; R2-1707852, Aug. 20, 2017, 6 pages.

\* cited by examiner

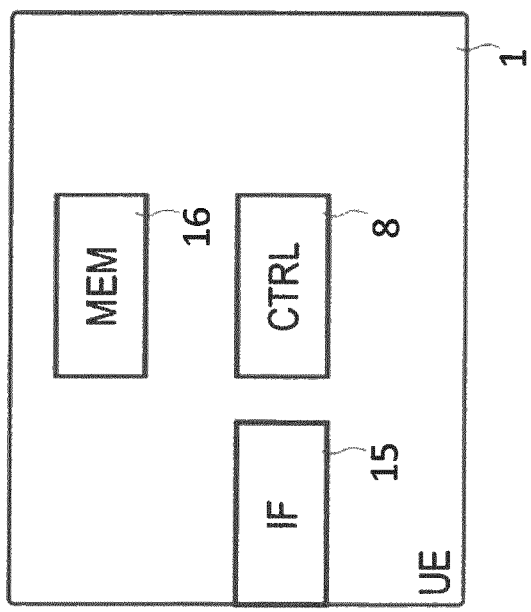

PRIORITIZATION METHOD FOR RADIO ACCESS TECHNOLOGIES USED FOR WIRELESS DATA COMMUNICATION

TECHNICAL FIELD

The present application generally refers to techniques of performing wireless data communication based on a plurality of radio access technologies. In certain embodiments, the application refers to prioritizing at least one radio access technology from a plurality of radio access technologies for wireless data communication.

BACKGROUND

Multimode user equipments adapted for 3GPP systems enable a flexible use based on the underlying environmental conditions, as they support a variety of different radio access technologies (RAT), such as GSM, WCDMA, LTE and 5G/NR. Such underlying environmental conditions may e.g. refer to a specific geolocation, and a flexible use of specific RATs at such a specific geolocation may for example be advantageous due to an improved power balance or an improved security level of the user equipment.

A user equipment (UE) being operated in idle mode usually is in control of its own cell reselection procedures, and the UE can select the RAT that is appropriate to keep active or inactive for candidate cell section.

A UE operating in connected mode, however, needs to follow radio network control signaling for neighbor cell measurements and handover. Hence, if a UE has signaled a certain RAT support in its UE capability signaling, the network expects that the UE is capable of conducting neighbor cell measurements, reporting and handover for cells using that radio access technology.

For both idle mode and active mode scenarios there could be situations where the UE doesn't have any specific benefit of using a certain RAT. This could be the case, for example, when there is a relatively new RAT entering the market, and using the new RAT would be non-preferred from the UE perspective in terms of e.g. power consumption in the UE, or when there is a huge difference in radio access capabilities between the RATs, e.g., if the expected data rate of an old legacy RAT is so low that the UE would not prefer to use that RAT.

Hence, the UE may know that using a certain RAT is not quite interesting from the UE perspective, but according to existing 3GPP signaling there is no obvious method to signal such information to the network.

At present, widely used existing solutions include user-based manual deactivation of RATs. In such known solutions, a UE may deactivate a RAT by performing a restart of the cellular modem, or similar procedure of deactivation and re-activation of the radio access communication based on the user-based control. However, such an approach is considered less user-friendly and further may in certain circumstances not be suited to be adapted to specific environmental conditions in real time.

SUMMARY

As a matter of consequence, there is a need to dynamically control the provision of RATs to a user equipment, which may enable high quality wireless data communication at specific environmental conditions.

It is an objective of the present application to provide for a method for use in a user equipment, as well as a corresponding device, for performing wireless data communication, which offers a high-quality wireless data communication to a user equipment in preferably any environmental condition.

It is a further objective of the present application to provide for a method for use in a network node of a wireless network, as well as a corresponding device, which supports wireless data communication of a user equipment in that the user equipment performs a high-quality wireless data communication in preferably any environmental condition.

A method for use in a user equipment, a method for use in a network node of a wireless network as well as a first device and a second device are provided according to the independent claims. Further embodiments are defined in the dependent claims.

According to an embodiment, a method for use in a user equipment is disclosed. The user equipment is adapted to communicate with a wireless network using a plurality of RATs. The method comprises prioritizing at least one RAT from the plurality of RATs. The method further comprises transmitting uplink control signaling indicative of the prioritized at least one RAT to the wireless network.

Such an approach may be based on the finding that based on adequate criteria, the user equipment itself automatically selects most favorable RATs at any time and at any location and transmits information regarding these selected most favorable RATs to the wireless network, wherein the latter may control such a selection from a network point of view. Thus, a dynamic adaption of favorable RATs in real time is possible, without requiring any manual user input at least in some scenarios.

For example, the uplink control signaling may be transmitted using the prioritized at least one RAT or may be transmitted using a non-prioritized RAT. If the non-prioritized RAT is employed for communication between the user equipment and the network, the techniques described herein may facilitate adaptation of the RAT used for communicating between the user equipment and the network by at least attempting to switch to the prioritized at least one RAT. One or more appropriate network actions may be taken in this regard.

According to another embodiment, a method for use in a network node of a wireless network connectable to a user equipment is disclosed. Hereby, the user equipment is adapted to communicate with a wireless network using on a plurality of RATs. The method comprises receiving, from the user equipment, uplink control signaling indicative of at least one prioritized RAT prioritized from a plurality of RATs.

In some examples, the method may further comprise considering the prioritized at least one RAT when performing at least one network action associated with the user equipment.

Such an approach may be based on the finding that receiving priority related information of RATs by a network node of a wireless network enables to accept or not accept an automatic selection of most favorable RATs selected by a user equipment. If the prioritized at least one RAT is accepted, then the at least one network action may be aligned with any requirements imposed by the prioritized at least one RAT and/or requirements imposed by an attempt to switch to the prioritized at least one RAT. Otherwise, the at least one network action may be aligned with the previously employed RAT. Thus, such a method may control the performance of a dynamic adaption of most favorable RATs in real time, without requiring any manual user input at least in some embodiments.

Different types and kinds of network actions may be subject to the techniques described herein. For example, the at least one network action may be associated with establishment of a data connection between the wireless network and the user equipment using the prioritized at least one RAT. However, it is not required that in all scenarios the data connection using the prioritized at least one RAT is ultimately set up: For example, it would be possible that—while the wireless network generally accepts the prioritized at least one RAT—other reasons, e.g., a poor signal quality of a corresponding cell of the prioritized at least one RAT as indicated by subsequent cell measurements—eventually prevent establishment of the data connection using the prioritized at least one RAT. Thus, the at least one network action may be associated with the establishment or, generally, establishment attempt of the data connection using the prioritized at least one RAT. Thus, it is generally not required that—even though at least one RAT is prioritized—communication between the user equipment and the wireless network is in fact also implemented using the prioritized at least one RAT.

For example, the at least one network action may correspond to control signaling, or generally performing communication, associated with the user equipment. Thus, it is possible that communication associated with the user equipment is performed based on the prioritized at least one RAT. At the same time, it is not required that this communication or specifically the control signaling is implemented using the at least one RAT; rather, it would be possible that the communication or specifically the control signaling is implemented using a non-prioritized RAT. For example, the same RAT may be employed that is also employed for the uplink control signaling.

Further examples of network actions include paging of the user equipment (UE) which may facilitate establishment of a data connection using the prioritized at least one RAT.

Further examples of network actions include establishment of the data connection. For example, a connection setup control signaling could be communicated.

Further examples of network actions include informing the UE and/or other network nodes—e.g., other base stations—of whether the prioritized at least one RAT is accepted or not accepted.

Further examples of network actions include providing configuration data for cell measurements, e.g., in accordance with the prioritized at least one RAT.

Further examples of network actions include performing an inter-RAT hand over, e.g., to the prioritized at least one RAT. Also, a redirection of the UE to a cell operating according to the prioritized at least one RAT would be possible.

According to another embodiment, a UE is configured to perform wireless data communication with a network node of a wireless network using a plurality of RATs. The UE comprises control circuitry configured to prioritize at least one RAT from the plurality of RATs and to transmit uplink control signaling indicative of the prioritized at least one RAT to the network node.

According to another embodiment, a network node of a wireless network is configured to perform wireless data communication with a UE using a plurality of RATs. The network node comprises control circuitry configured to receive, from the UE, uplink control signaling indicative of at least one prioritized RAT prioritized from a plurality of RATs; and to consider the prioritized at least one RAT when performing at least one network action associated with the UE. UE.

A RAT within the meaning of the present disclosure may refer to a physical connection method for a communication network, which may include one or more carriers on one or more radio frequencies, transmission protocols, framing structures, acknowledgement schemes, and/or modulation and coding schemes, etc. A plurality of RATs may be supported by a single UE. A RAT may refer to at least one of the techniques Bluetooth, Wi-Fi, 3G, 4G, 5G and LTE.

An uplink control signaling within the meaning of the present disclosure may refer to any signaling transmitted from a UE to a network node of a wireless network, which may contribute to a control of the UE and/or the network node and/or the wireless network. Hereby, control may be based on any information with respect to a prioritization of radio access technologies. For example, Layer 2 or Layer 3 control signaling may be used, according to the Open Systems Interface (OSI) model.

In an embodiment of the method for use in a UE, the method further comprises receiving downlink control signaling from the wireless network in response to transmitting the uplink control signaling, wherein the downlink control signaling is indicative of whether the prioritized at least one RAT is accepted.

Thereby, prioritizing the at least one RAT from the plurality of RATs may additionally be controlled by the wireless network using a network point of view. Since the wireless network may comprise additional information used for controlling, whether the RATs prioritized by the UE are to be accepted or not accepted, additional influences, which are not observed by the UE, may therefore be taken into account for controlling the communication method. These may include, but are not limited to: network load for the RATs, quality of service for the RATs, etc.

In an embodiment of the method for use in a UE, the method further comprises performing data communication based on the prioritized at least one RAT and in accordance with the downlink control signaling.

Thereby, a high quality data communication may be performed by the UE based on the RATs, which are to be considered most favorable with respect to the underlying conditions and the intended use.

In an embodiment of the method for use in a UE, the method further comprises performing cell measurements in accordance with the received downlink control signaling.

Thereby, high quality cell measurements may be performed by the UE based on the RATs, which are to be considered most favorable with respect to the underlying conditions and the intended use.

In an embodiment of the method for use in a UE, the cell measurements are performed based on the prioritized at least one RAT, upon the prioritized at least one RAT being acknowledged.

Thereby, a prioritization of at least one RAT from the plurality of RATs may be confirmed, if such a prioritization is also to be considered advantageous from a network point of view and/or based on the information provided at the network.

In an embodiment of the method for use in a UE, the cell measurements are performed based on the plurality of RATs, upon the prioritized at least one RAT not being acknowledged.

Thereby, a prioritization of at least one RAT from the plurality of RATs may be avoided, if such a prioritization is to be considered disadvantageous from a network point of view and/or based on the information provided at the network.

In an embodiment of the method for use in a UE, the method further comprises receiving further downlink control signaling, wherein the further downlink control signaling comprises override data, which induce an adaption of whether the cell measurements are performed based on the prioritized at least one RAT or based on the plurality of RATs.

Thereby, the RATs used by the UE, which are based on the prioritization of the at least on RAT from the plurality of RATs, may be adapted to different environmental conditions and may therefore be flexibly used.

In an embodiment of the method for use in a UE, the prioritizing the at least one RAT is based on at least one of an energy consumption, a network access state, a security level, a geolocation, a timing, a service type and a quality of service.

According to a further embodiment of the method for use in a UE, the uplink control signaling is indicative of the at least one of the energy consumption, the network access state, the security level, the geolocation, the timing, the service type, and the quality of service.

Thereby, the UE may prioritize the at least one RAT from the plurality of RATs, which is, based on the present environmental conditions of the UE, most favorable to be used with respect to any policy requirements, e.g. security or energy consumption.

The energy consumption may be associated with energy consumptions estimated for the various RATs. The security level may be associated with a level of protection of secure data communication that may be achieved for the various RATs. The security level may be associated with a level of protection of secure data communication that is considered required for specific services. Such service could be a specific service offered by the RAT, e.g. an IMS based communication, SMS, data transfer etc. Such service could also be a specific end point for the intended communication, e.g. an IP address or a specific access domain.

The geolocation may be expressed in terms of latitude and longitude or in terms of cells of the wireless network. The timing may relate to a time of the day or time of the week. The timing may relate to a duration for which communication on one or more RATs is desired. The quality of service may relate to an intended latency and/or communication reliability.

The service type may correlate with the quality of service associated with the respective service. For example, the service type may be one or more of the following: music streaming; audio streaming; video streaming; web browsing; videoconferencing; Web Real-Time Communication; database transaction; HTTP requests and/or responses; IP sessions; etc. The service type may be associated with a specific application or a group of applications.

In an embodiment of the method for use in a UE, the uplink control signaling is included in a) a UE capability signaling and/or b) a UE uplink control signal and/or c) a RRC configuration message.

Thereby, the uplink control signal may be implemented in an established signaling technique and may therefore be included in a preferably efficient manner. Existing signaling may be re-used.

In an embodiment of the method for use in a UE, the uplink control signaling includes a list of at least one RAT which is not prioritized.

Thereby, the wireless network is informed about the radio access technologies for deactivation in a preferably simple manner.

In an embodiment of the method for use in a UE, said prioritizing of the at least one RAT is performed differently for at least two of a) an idle network access state, b) an inactive network access state and c) an active network access state of the UE.

Thereby, deactivation certain RATs may additionally take the present mode of the UE into account. Thus, an improved flexibility of the method with respect to the underlying circumstances may be achieved.

In an embodiment of the method for use in a UE, the prioritized radio access technologies comprise at least one of GSM, WCDMA, LTE, 5G, NR and WiFi.

Thereby, deactivation of RATs also refers to techniques, which are at present commonly implemented and activated in most of the UEs. Thereby, energy savings may be achieved.

In an embodiment of the method for use in a network node of a wireless network, the at least one network action comprises accepting or not accepting the prioritized at least one RAT. According to a further embodiment of the method for use in a network node of a wireless network, the method further comprises transmitting downlink control signaling to the UE in response to the uplink control signaling and indicative of whether the at least one prioritized RAT is accepted.

Thereby, the establishment of the communication in between the wireless network and the UE may be implemented with preferably simple technical means.

In an embodiment of the method for use in a network node of a wireless network, the at least one network action comprises instructing the UE to perform cell measurements based on the at least one prioritized RAT.

Thereby, a single signaling may be implemented to the method, which includes both control with respect to the deactivation of RATs and instructions with respect to the performance of cell measurements. Such means may enable a more efficient signal packaging.

In an embodiment of the method for use in a network node of a wireless network, the at least one network action comprises allocating radio resources for communicating with the UE based on the at least one prioritized RAT.

In an embodiment of the method for use in a network node of a wireless network, the method further comprising transmitting further downlink control signaling comprising override data, which induce an adaption of whether cell measurements are performed based on the prioritized at least one RAT or based on the plurality of RATs.

Thereby, deactivation of specific RATs may be adapted over time based on any modified environmental conditions.

In an embodiment of the method for use in a network node of a wireless network, the uplink control signaling is included in a) a UE capability signaling and/or b) a UE uplink control signal and/or c) a RRC con-figuration message.

Thereby, the uplink control signal may be implemented in an established signaling technique and may therefore be included in a preferably efficient manner.

In an embodiment of the method for use in a network node of a wireless network, the uplink control signaling includes a list of at least one RAT which is not prioritized.

Thereby, the wireless network is informed about the radio access technologies for deactivation in a preferably simple manner.

In an embodiment of the method for use in a network node of a wireless network, the method further comprises transmitting an inter-RAT handover command to a further network node.

Thereby, prioritization information may also be used for establishing wireless data communication with a further network node. This may be helpful where different RATs are supported by different network nodes, e.g., part of different wireless data networks.

In an embodiment of the first device, the first device is configured to perform the method according to any of the embodiments outlined above.

In an embodiment of the second device, the second device is configured to perform the method according to any of the embodiments outlined above.

A downlink control signaling within the meaning of the present disclosure may refer to any signaling transmitted from a network node of a wireless network to a UE, which may contribute to a control of the UE and/or the network node and/or the wireless network. Hereby, control may be based on any information with respect to a prioritization of radio access technologies. Layer 2 or Layer 3 control signaling may be used.

A cell measurement within the meaning of the present disclosure may refer to any procedure for achieving information of wireless network cells located in the proximity of a UE. Hereby, the UE may perform the cell measurement. The cell measurement performed by the UE may serve to estimate the quality of the respective wireless communication network.

The above summary is merely intended to give a short overview over some features of some embodiments and implementations and is not to be construed as limiting. Other embodiments may comprise other features than the ones explained above.

BRIEF DESCRIPTION OF THE DRAWINGS

The above and other elements, features, steps and characteristics of the present disclosure will be more apparent from the following detailed description of embodiments with reference to the following figures:

FIG. 2a schematically illustrates the UE in greater detail according to various examples.

DETAILED DESCRIPTION OF THE DRAWINGS

Figure 1:
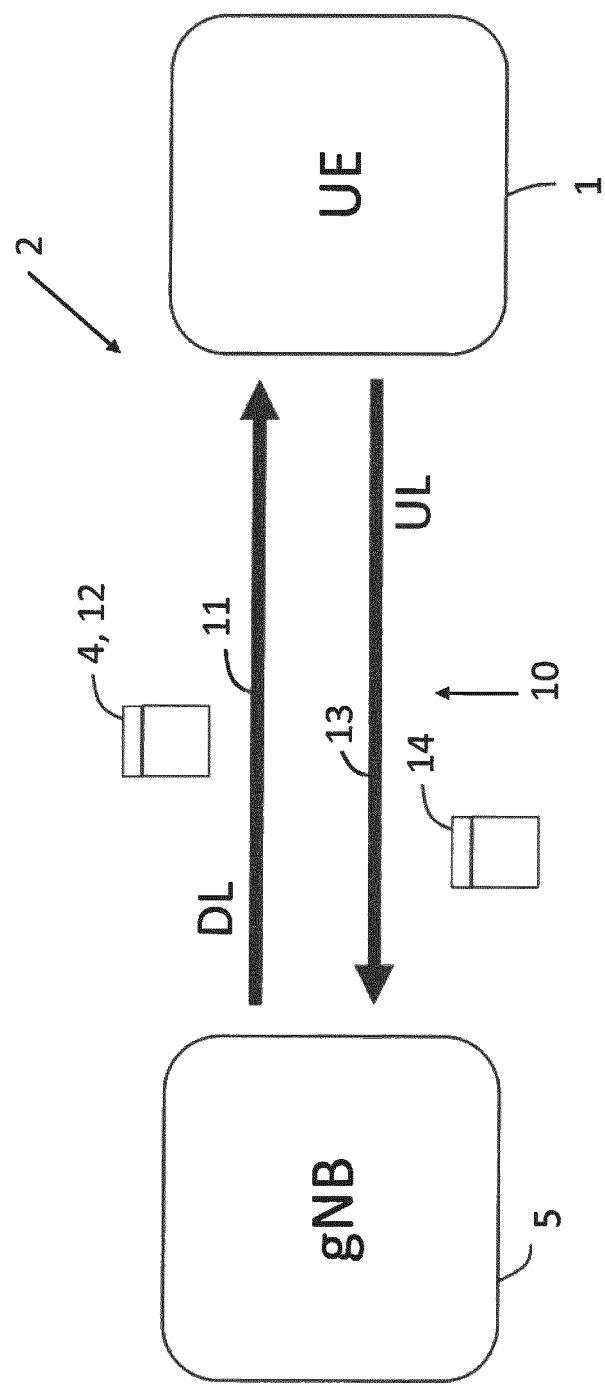
FIG. 1 schematically illustrates a network performing wireless data communication between a base station and a UE according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings, which are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wireless communication in a wireless network are disclosed. For example, the wireless network may be a cellular network comprising multiple cells, wherein each cell is defined by one or more BSs. Example network architectures include the 3GPP LTE architecture. According to 3GPP LTE, a wireless channel is defined according to the evolved UMTS Terrestrial Radio Access (EUTRAN) RAT. Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. In particular, such techniques may be applied in 3GPP NB-IoT or eMTC networks and 3GPP New Radio (NR) networks. Furthermore, respective techniques may be readily applied to various kinds of non-3GPP-specified architectures, such as Bluetooth, satellite communication, IEEE 802.11x Wi-Fi technology, etc. In various examples, it is possible to prioritized between RATs associated with one or more of the aforementioned network types.

FIG. 1 schematically illustrates a wireless network 2 for performing wireless data communication that may benefit from the techniques disclosed herein. The network 2 may support a plurality of RATs, which may comprise at least one of GSM, WCDMA, LTE, 5G, NR and WiFi. Uplink control signaling 3 and downlink control signaling 4 may also be communicated.

The wireless network 2 for wireless data communication includes a UE 1 and a network node (gNB) 5. As an example, such a UE 1 might be one of the following: a smartphone; a cellular phone; a table; a note-book; a computer; a smart television; a Machine Type Communication (MTC) device; an enhance MTC (eMTC) device; an Internet of Things (IoT) device; a Narrowband IOT (NB-IoT) device; a sensor; an actuator; etc. Network node 5 might also be one of the following: a Node-B (NB); an evolved Node-B (e-NB) in 3GPP LTE; or a gNB as in 3GPP NR; etc. In particular, where multiple RATs are supported, different types of network nodes—specifically different types of base stations—may be used.

A wireless data link 10 provided for wireless data communication is established between the UE 1 and the gNB 5. The wireless data link 10 may implement a downlink (DL) data channel 11. The DL data channel 11 can be used for transmitting downlink (DL) data 12 from the gNB 5 towards the UE 1. These DL data 12 may include downlink control signaling 4. The wireless data link 10 may also implement an uplink (UL) data channel 13 for transmitting uplink (UL) data 14 from the UE 1 towards the gNB 5.

A UE operating in connected mode needs to follow radio network control signaling for neighbor cell measurements and handover. Hence, if a UE has signaled a certain radio access technology (RAT) support in its UE capability signaling the network expects that the UE is capable of conducting neighbor cell measurements, reporting and handover for cells using that radio access technology.

For both idle mode and active mode scenarios, there could be situations where the UE doesn't have any specific benefit of using a certain RAT. This could be the case, for example, when there is a relatively new RAT entering the market, and using the new RAT would be non-preferred from the UE perspective in terms of e.g. power consumption in the UE, or when there is a huge difference in radio access capabilities between the RATs, e.g., if the expected data rate of an old legacy RAT is so low that the UE would not prefer to use that RAT.

Hence, the UE may know that using a certain RAT is not quite interesting from the UE perspective, but according to existing 3GPP signaling there is no obvious method to signal such information to the network.

According to certain reference implementations, it is possible that a user of the UE 1 manually excludes one or more RATs that are, in principle, supported by an interface of the UE 1. For example, the user may exclude use of 3GPP 3G technology, while use of 3GPP 4G and 5G technology is allowed. In this regard, in such reference implementations, a capability of the UE 1 may be signaled to the gNB 5. This may include transmission of a UE capability control message. The UE capability control message may be indicative of the supported RATs, e.g., depending amongst other factors such as hardware capability on the user input. An example of such a capability control message for LTE can be found in 3GPP Technical Specification (TS), 36.331, V14.0.0 (2016 September), section 5.6.3. An example of how UE capabilities can be specified can be found in the LTE specifications TS 36.306 V14.0.0 (2016 September), section 4. For example, according to such reference implementations, a reset of the connection with the network, including disconnecting the UE 1 and reconnecting the UE 1, may be required to indicate a change in prioritization and/or to implement a change in prioritization of RATs. This may be time consuming, increase latency of data transmission, etc.

To manually exclude one or more RATs may also be a too coarse RAT control since the non-prioritized RAT should perhaps only be down prioritized in certain use cases instead of all the time. From a network perspective it is not a favorable situation if UEs tend to deactivate data efficient RATs for long periods of time. Also, when using manual RAT deactivation, such switching may cause signaling overhead if modified frequently.

Hereinafter, techniques are described which help to mitigate such problems.

To overcome above-mentioned deficiencies, embodiments of this disclosure propose to dynamically handle the use of different RATs for the new 5G networks, which may operate in so-called non standalone mode. In such mode, the new 5G radio is very tightly integrated with 4G/LTE access, and the use of 5G radio can be controlled very flexibly from a network perspective. In other words, such embodiments propose adding signaling to indicate a UE preference on RAT activation/deactivation. In some embodiments, the proposed indication may control the network usage of different RATs for different UE states or services.

The idea behind such embodiments is to introduce a new function into the 3GPP RAN standard, specifically controlling dynamic activation and deactivation of RATs. The control could be made differently for the different UE states (e.g. RRC states such as idle, inactive and active) or if other states are known/controlled by the network (e.g. attended traffic, unattended traffic etc). The network is then expected to control the function, but since the primary target is to avoid user based manual on/off switching, the function should be initiated by a UE indicator signal.

FIG. 2a schematically illustrates the UE 1. The UE 1 includes an interface 15. For example, the interface 15 may include an analog front end and a digital front end. In some examples, the interface 15 may include a main receiver and a low-power receiver (not illustrated in FIG. 2). Each one of the main receiver and the low-power receiver may include an analog front end and a digital front end, respectively. The UE 1 further includes control circuitry 8, e.g., implemented by means of one or more processors and software. The control circuitry 8 may also be at least partly implemented in hardware. For example, program code to be executed by the control circuitry 8 may be stored in a non-volatile memory 16. In the various examples disclosed herein, various functionality may be implemented by the control circuitry 8, e.g. prioritizing 110, 210, 310 at least one RAT from the plurality of RATs; transmitting 120, 220, 320 uplink control signaling 3 indicative of the prioritized at least one RAT to the wireless network 2; receiving 130, 230, 330 downlink control signaling from the wireless network 2 in response to transmitting 120, 220, 320 the uplink control signaling 3; etc.

Figure 2B:
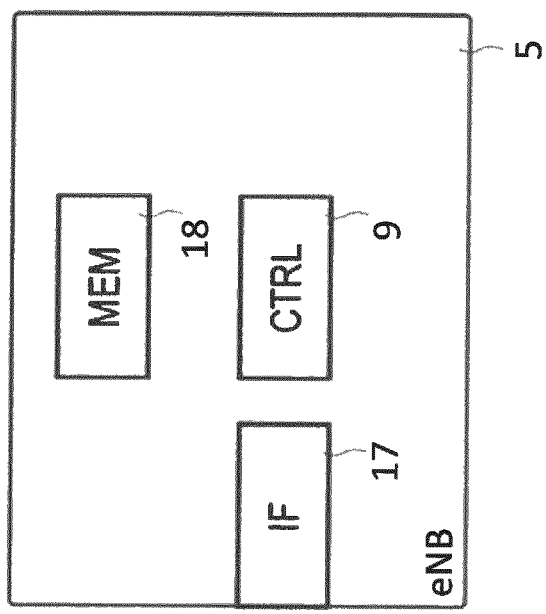
FIG. 2b schematically illustrates the base station in greater detail according to various examples.

FIG. 2b schematically illustrates the network node 5. The network node 5 includes an interface 17. For example, the interface 17 may include an analog front end and a digital front end. The network node 5 further includes control circuitry 9, e.g., implemented by means of one or more processors and software. For example, program code to be executed by the control circuitry 9 may be stored in a non-volatile memory 18. In the various examples disclosed herein, various functionality may be implemented by the control circuitry 9, e.g. receiving 410, 510 from the UE 1, uplink control signaling 3 indicative of at least one prioritized RAT prioritized from a plurality of RATs; performing 420, 520 one or more network actions, e.g., to trigger establishment of a data connection with the UE 1 based on the prioritized at least one RAT; etc.

Figure 3:
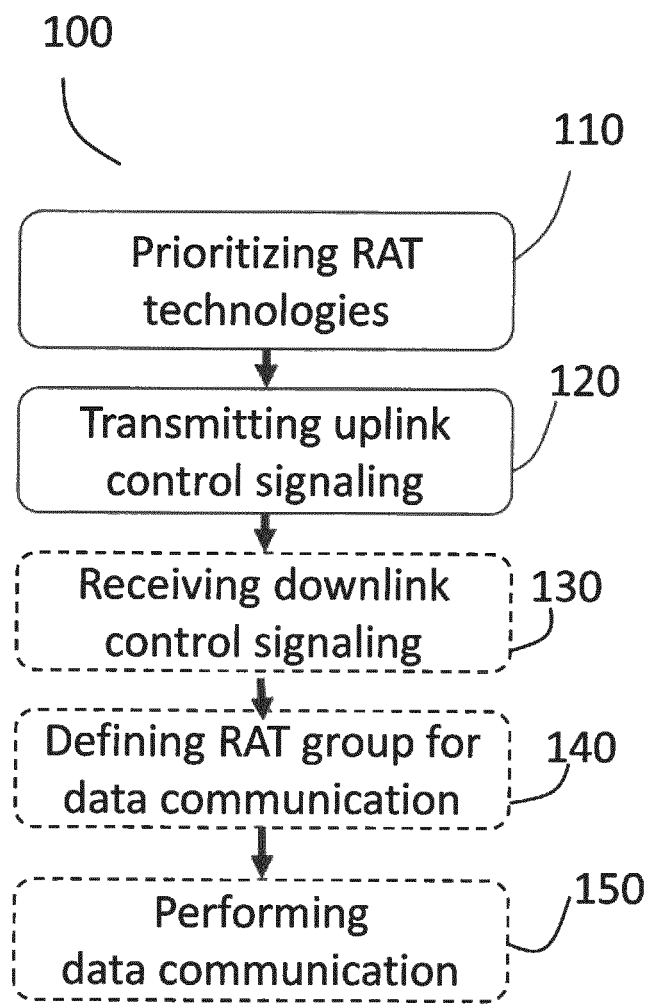
FIG. 3 represents a flowchart of a method for use in a UE according to various examples.

FIG. 3 represents a flowchart of a method 100 for use in a UE 1 and/or a first device 6 according to various examples. With respect to this method 100, the UE 1 may be adapted to communicate with the wireless network 2 using a plurality RATs. Such a prioritized RAT may e.g. be associated with at least one of GSM, WCDMA, LTE, NR, and WiFi.

At 110, the UE 1 may prioritize at least one RAT from the plurality of RATs. This may be based on at least one of an energy consumption, a network access state, a security level, a geolocation, a timing and a quality of service. Prioritizing 110 may also take different modes of the UE 1 into account. As an example, prioritizing 110 of the at least one RAT may be performed differently for at least two of a) an idle network access state of the UE 1, b) an inactive network access state of the UE 1, and c) an active network access state of the UE 1. Examples of an idle network access state of the UE 1 include Radio Resource Control (RRC) idle. In an active network access state of the UE 1, a data connection may be maintained between the UE 1 and the network 2. The data connection may include one or more bearers, e.g., a default bearer and one or more dedicated bearers. In the inactive network access state of the UE 1, the UE 1 may at least temporarily be operated in a sleep state in which the receiver is shut down. Discontinuous reception cycles may be employed. In the idle network state of the UE 1 the data connection may be released; the UE 1 may be paged which corresponds to performing a network action associated with establishment of the data connection.

Subsequently at 120, the uplink control signaling 3 indicative of the prioritized at least one RAT may be transmitted to the wireless network 2. Hereby, the uplink control signaling 3 may be indicative of the at least one of the energy consumption, the network access state, the security level, the geolocation, the timing and the quality of service. Further, the uplink control signaling 3 may be included in a) a UE capability signaling and/or b) a UE uplink control signal and/or c) a RRC configuration message. Further, the uplink control signaling 3 may include a list of at least one RAT technology, which is not prioritized.

Subsequently at 130, the downlink control signaling 4 may be received from the wireless network 2 in response to transmitting 120 the uplink control signaling 3. In this context, the downlink control signaling 4 may be indicative of whether the prioritized at least one RAT is accepted.

Subsequently at 140, the RAT group for data communication may be defined based on the received downlink control signaling 4.

Subsequently at 150, data communication based on the prioritized at least one RAT and in accordance with the downlink control signaling 4 may be performed. In other scenarios, cell measurements may be initially performed before deciding whether to perform the data communication using the prioritized at least one RAT. This is illustrated in connection with FIG. 4.

Figure 4:
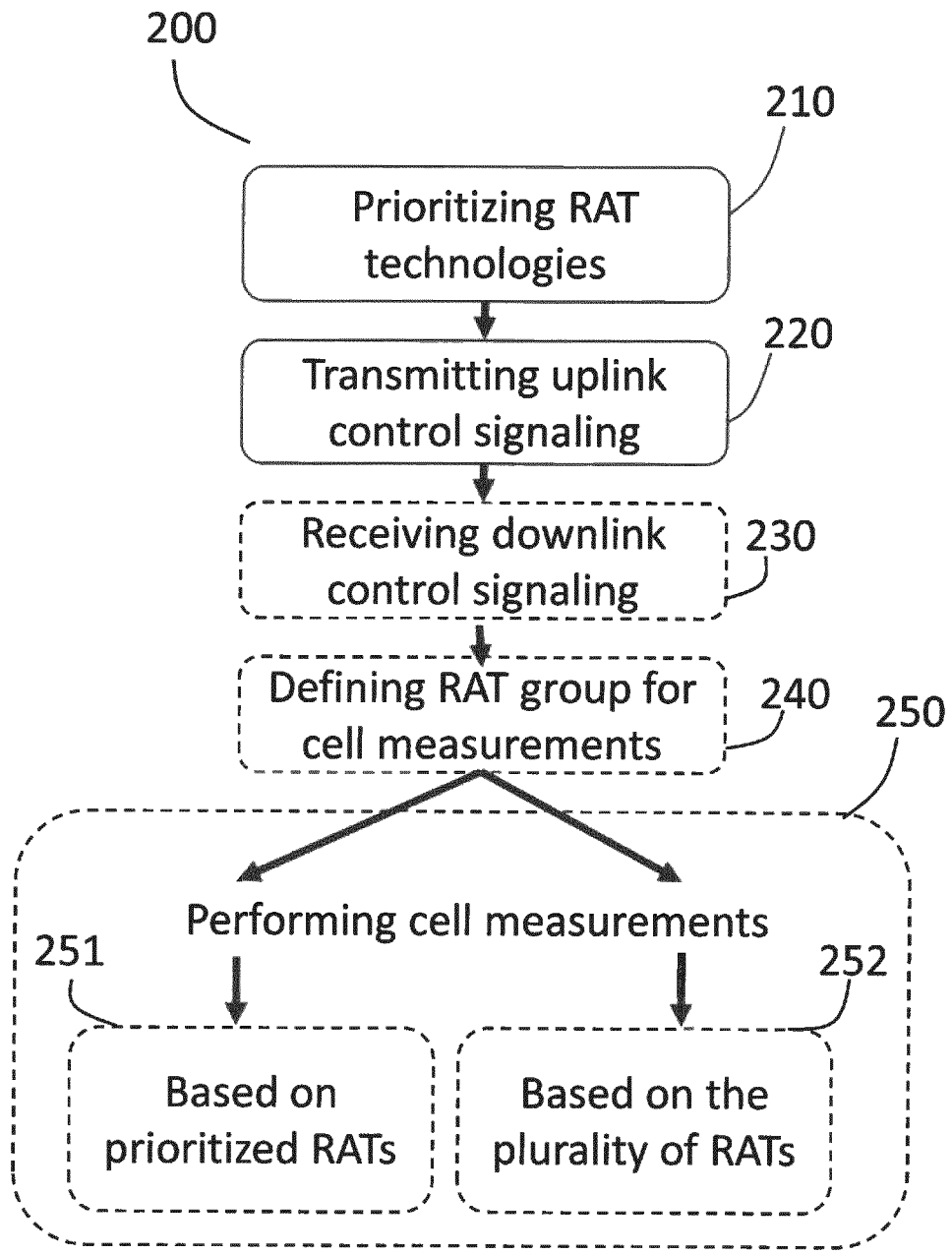
FIG. 4 represents a flowchart of a further method for use in a UE according to various examples.

FIG. 4 represents a flowchart of a further method 200 for use in a UE 1 according to various examples. Hereby, prioritizing RAT technologies 210, transmitting uplink control signaling 220 and receiving downlink control signaling 230 may be performed similarly or even equally to prioritizing RAT technologies 110, transmitting uplink control signaling 120 and receiving downlink control signaling 130 of the method 100 according to FIG. 3.

Subsequently at 240, an RAT group for performing cell measurements may be defined.

Subsequently at 250, cell measurements may be performed in accordance with the received downlink control signaling 4. These cell measurements may be performed differently. In case that the prioritized at least one RAT is acknowledged, cell measurements may be performed 251 based on the prioritized at least one RAT. In case that the prioritized at least one RAT is not acknowledged, cell measurements may be performed 252 based on the plurality of RATs, i.e., for all RATs and not selectively for the prioritized at least one RAT.

Figure 5:
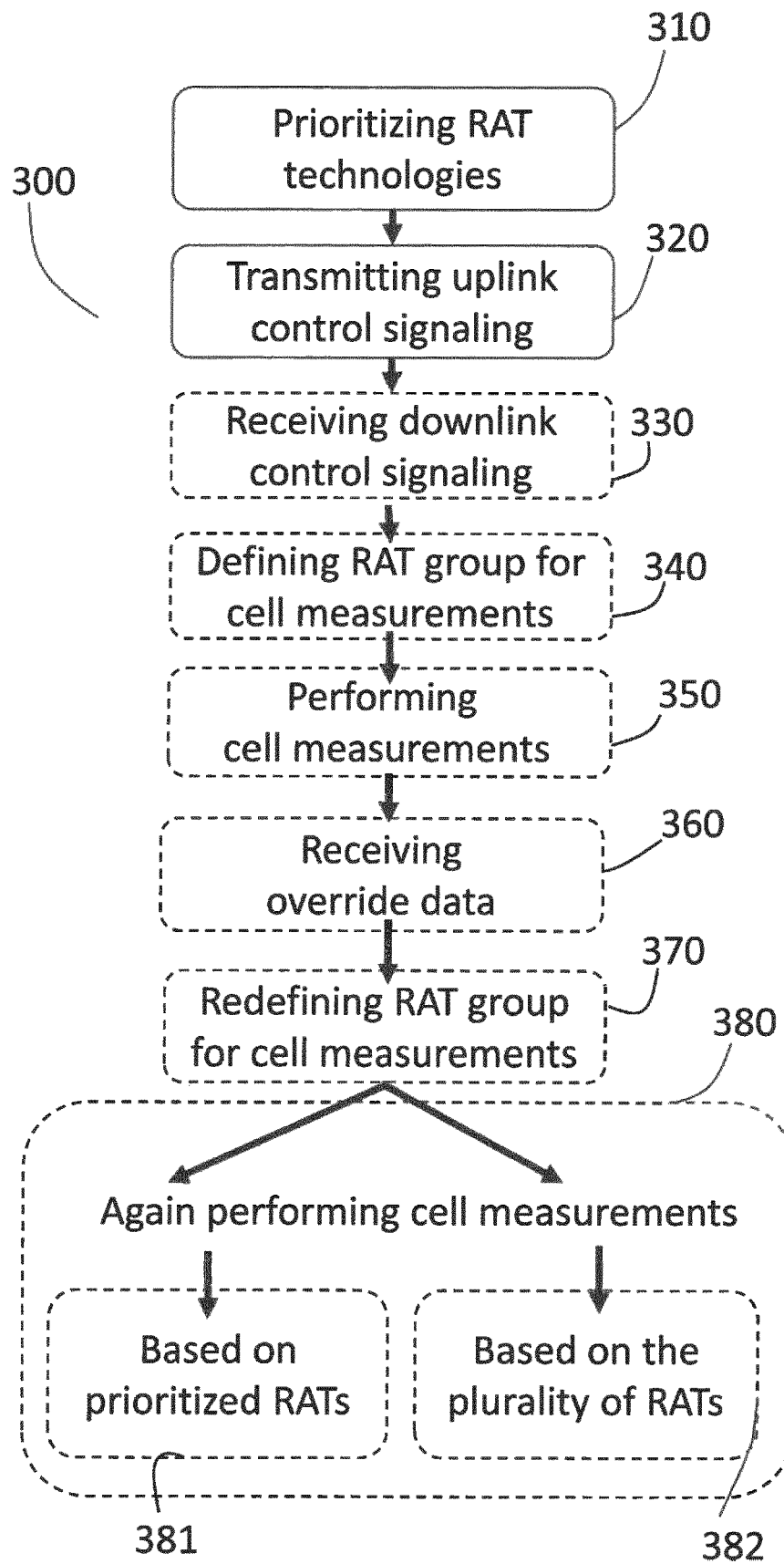
FIG. 5 represents a flowchart of a further method for use in a UE according to various examples.

FIG. 5 represents a flowchart of a further method 300 for use in a UE according to various examples. Hereby, prioritizing RAT technologies 310, transmitting uplink control signaling 320, receiving downlink control signaling 330, defining the RAT group for performing cell measurements 340 and performing cell measurements 350 may be performed similarly or even equally to prioritizing RAT technologies 210, transmitting uplink control signaling 220, receiving downlink control signaling 230, defining the RAT group for performing cell measurements 240 and performing cell measurements 250 of the method 200 according to FIG. 4.

Subsequently at 360, further downlink control signaling 4 may be received. Such further downlink control signaling 4 may comprise override data and may refer to an environmental change of the UE 1.

Subsequently at 370, the existing RAT group for performing cell measurements may be redefined.

Subsequently at 380 and based on the received override data, an adaption of whether the cell measurements may be performed based on the prioritized at least one RAT 381 or based on the plurality of RATs 382 may be induced.

Figure 6:
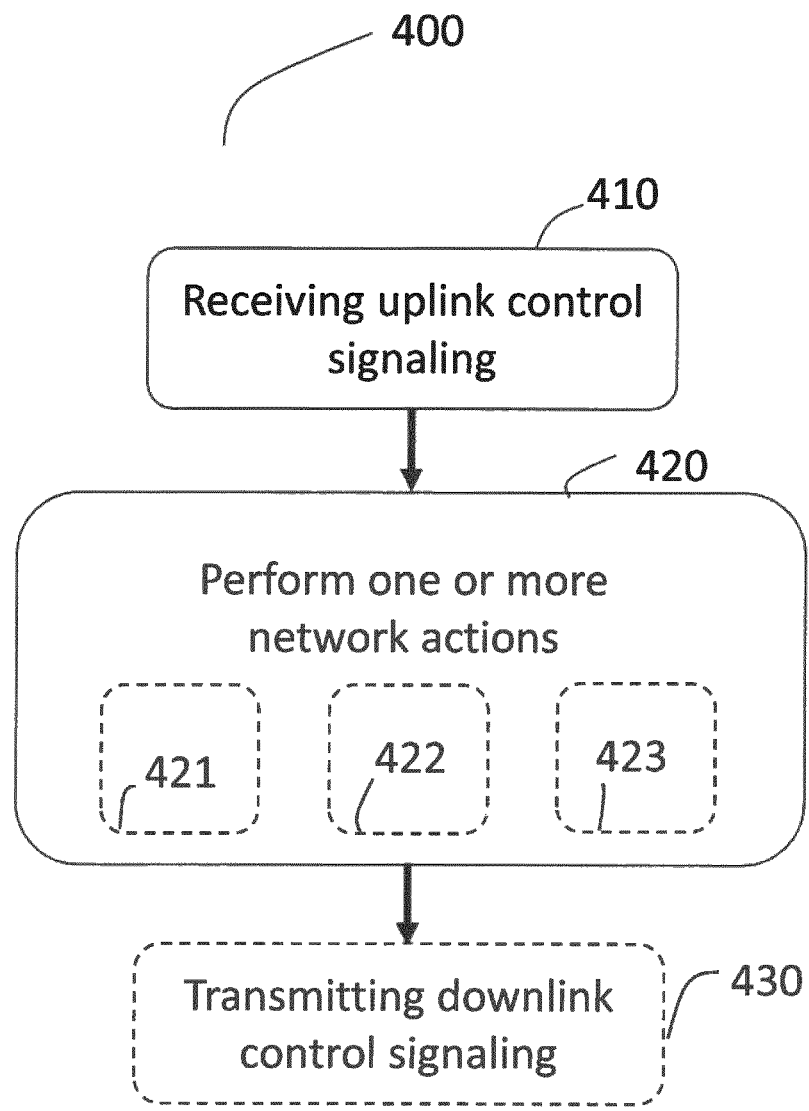
FIG. 6 represents a flowchart of a further method for use in a network node of a wireless network according to various examples.

FIG. 6 represents a flowchart of a further method 400 for use in a network node 5 of a wireless network 2 and/or a first device 7 according to various examples. Hereby, the UE 1 may be adapted to communicate with the wireless network 2 using on a plurality of RATs.

At 410, an uplink control signaling 3 indicative of at least one prioritized RAT prioritized from a plurality of RATs is received from the UE 1. Hereby, the uplink control signaling 3 may be included in a) a UE capability signaling and/or b) a UE uplink control signal and/or c) a RRC configuration message. Further, the uplink control signaling 3 may include a list of at least one RAT, which is not prioritized.

At 420, one or more network actions may be performed. The one or more network actions are performed in consideration of the prioritized at least one RAT. In other words, the one or more network actions take the prioritized at least one RAT into account, or the network actions are performed based on the prioritized at least one RAT. Stated differently, communication in the network performed subsequent to the receiving and associated with the UE, is based on the prioritized at least one RAT. Consequently, it may be possible to take into account the prioritized at least one RAT when operating the network 2. This may help align the operation of the network 2 with the indication of the UE 2 that the prioritized at least one RAT is preferred.

As a general rule, various options for performing the one or more network actions in consideration of the at least one RAT may be employed or in combination.

In one example, performing the one or more network actions may correspond to triggering to establish a data connection with the UE 1 based on the prioritized at least one RAT The one or more network actions may, in a further example, comprise accepting or not accepting 421 the prioritized at least one RAT. Further, the one or more network actions may comprise instructing 422 the UE 1 to perform cell measurements based on the prioritized at least one RAT. Further, the one or more network actions may comprise allocating 423 radio resources for communicating with the UE 1 based on the prioritized at least one RAT.

It is generally possible that the one or more network actions are selected from the group comprising: performing paging of the UE 2; Establishing a data connection with the UE 2; responding, to the UE 2, with approval or denial of the indication of the prioritized at least one RAT—i.e., accepting or not accepting the prioritized at least one RAT; providing a configuration of for cell measurement, e.g., bandwidths, center frequencies, subcarrier spacings, etc.; performing a handover, e.g., a inter-RAT handover; performing a redirect to trigger camping of the UE on another cell, e.g., operating according to another RAT; only accept UE initiated access attempts.

For example, it would be possible that one or more network actions are performed in order to facilitate establishment of the data connection with the UE 2 employing the prioritized at least one RAT. This may include performing an inter-RAT handover and/or cell measurements. For example, the cell measurements may be configured in accordance with the prioritized at least one RAT: here, a subcarrier spacing or a frequency bandwidth may be set according to operating parameters of the prioritized at least one RAT. By performing a redirect, the UE 2 operating in idle state can be controlled such that it starts camping on a cell operating according to the prioritized at least one RAT.

Subsequently at 430, the downlink control signaling 4 may be transmitted to the UE 1 in response to the uplink control signaling 3 and indicative of whether the prioritized at least one RAT is accepted.

Figure 7:
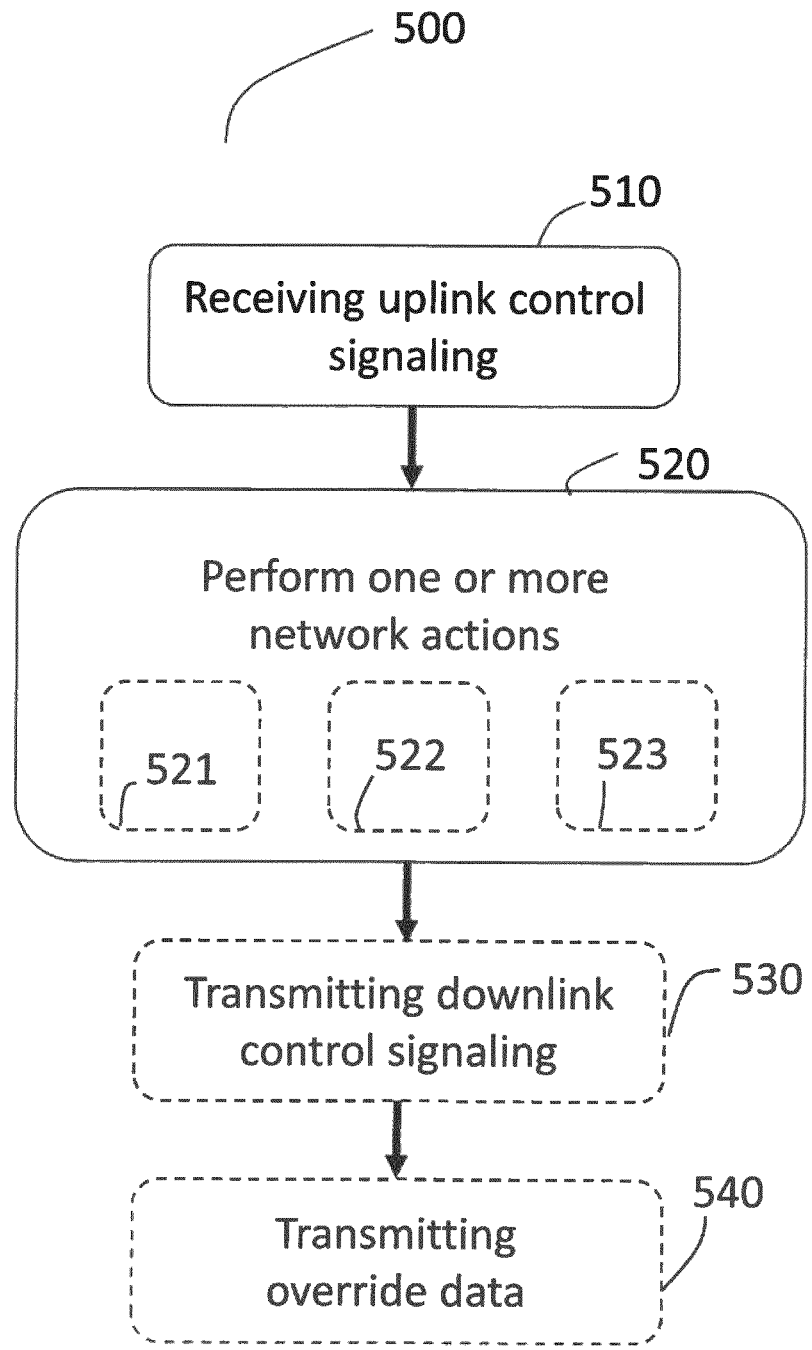
FIG. 7 represents a flowchart of a further method for use in a network node of a wireless network according to various examples.

FIG. 7 represents a flowchart of a further method 500 for use in a network node 5 of a wireless network 2 according to various examples. Hereby, receiving uplink control signaling 510, performing one or more network actions in consideration of the prioritized at least one RAT 520 and transmitting downlink control signaling 530 may be performed similarly or even equally to receiving uplink control signaling 410, performing one or more network actions in consideration of the prioritized at least one RAT 420 and transmitting downlink control signaling 430 of the method 400 according to FIG. 6.

Subsequently at 540, further downlink control signaling 4 may be transmitted. Such further downlink control signaling 4 may comprise override data and may refer to an environmental change of the UE 1. Hereby, these override data may induce an adaption of whether cell measurements are performed based on the prioritized at least one RAT or based on the plurality of RATs.

Figure 8:
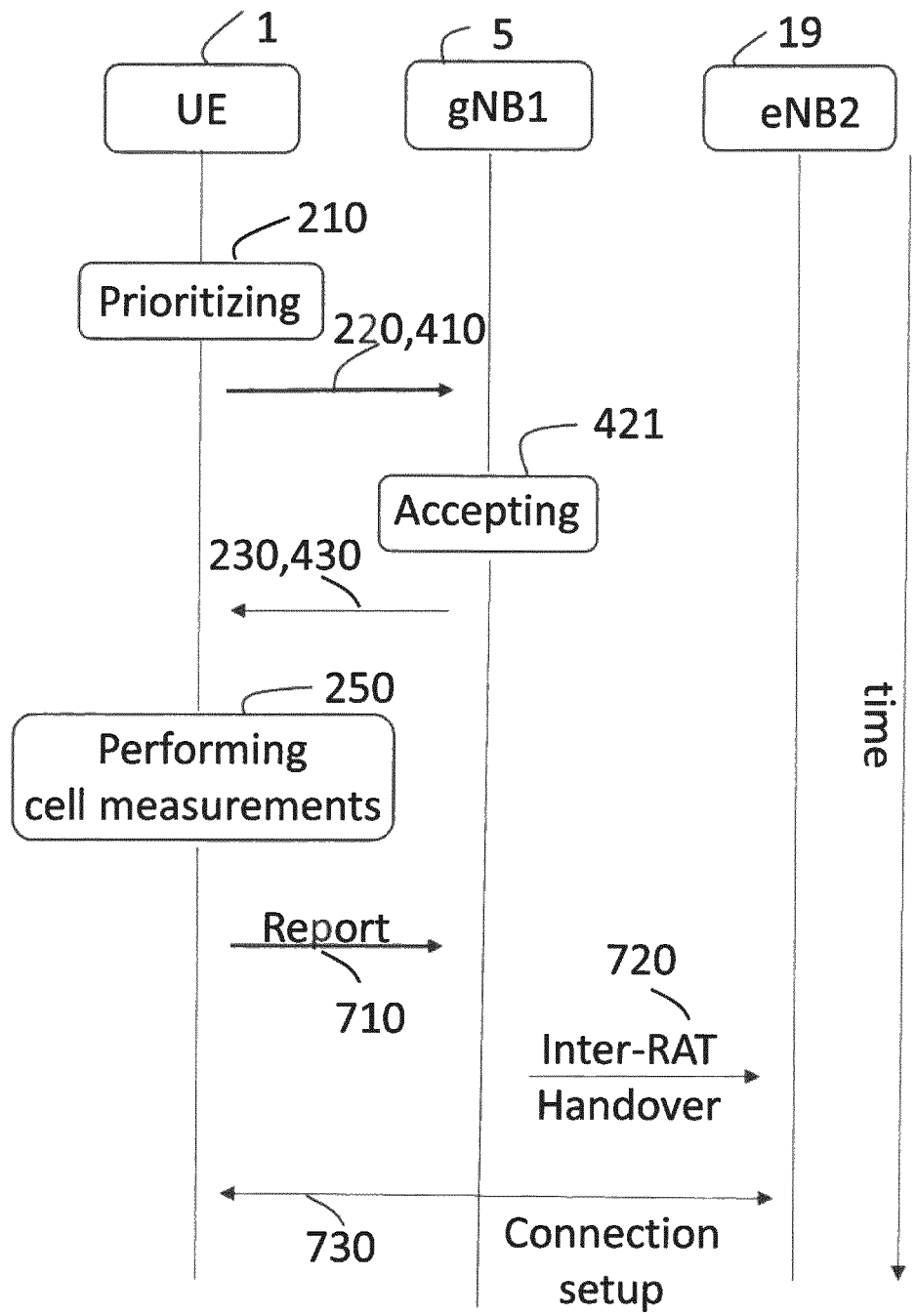
FIG. 8 schematically illustrates a signaling diagram of a UE, a first network node of a first wireless network and a second network node of a second wireless network according to various examples referring to FIG. 4 and FIG. 6.

FIG. 8 schematically illustrates a signaling diagram of a UE 1, a first network node (gNB1) 5 of a first wireless network 2 and a further network node (gNB2) 19 of a further wireless network 20 according to various examples. The signaling diagram may refer to perform any method 200 for use in a UE 1 according to FIG. 4 as well as to perform any method 400 for use in a network node 5 of a wireless network 2. Herein, a downward arrow representing a time scale referring to these method 200, 400 is implemented.

At 210, the UE may prioritize RAT technologies as explained with respect to FIG. 4.

Subsequently at 220, the UE may transmit uplink control signaling 3 as explained with respect to FIG. 4. At 410, the uplink control signaling 3 may then be received by the network node 5 of the wireless network 2 as explained with respect to FIG. 6.

Subsequently at 421, the prioritized at least one RAT may be accepted by the network node 5 as explained with respect to FIG. 6.

Subsequently at 430, the downlink control signaling 4 may then be transmitted to the UE 1. At 230, the downlink control signaling 4 may then be received by the UE 1.

Subsequently at 250, the UE 1 may then perform cell measurements as explained with respect to FIG. 4.

Subsequently, the UE 1 may report on the performed cell measurements to the network node 5 of the wireless network 2, 710. Based on this report, the wireless network 2 may or may not transmit an inter-RAT handover command to the further network node 19 of the further wireless network 20, 7250. For example, if the cell measurements indicate a good signal-to-interference-and-noise ratio for the prioritized at least one RAT, the inter-RAT handover command may be transmitted. Otherwise, the inter-RAT handover may be aborted. The scenario of FIG. 8 may be applicable where the prioritized at least one RAT is not supported by the network node 5, but rather by the further network node 19. By means of the inter-RAT handover command, the UE 1 triggers establishment of the connection based on the prioritized at least one RAT.

Subsequently and based on the transmission of this inter-RAT handover command, a connection setup in between the UE 1 and the further network node 19 may be established, 730.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A method of controlling network access by a user equipment, the user equipment being adapted to communicate with an associated wireless network using a plurality of radio access technologies supported by the user equipment, the method comprising:
   prioritizing, based on a mode of operation of the user equipment, at least one radio access technology from among the plurality of radio access technologies supported by the user equipment; and
   transmitting uplink control signaling indicative of the prioritized at least one radio access technology to the associated wireless network.

2. The method of claim 1, further comprising:
   receiving downlink control signaling from the associated wireless network in response to transmitting the uplink control signaling,
   wherein the down-link control signaling is indicative of whether the prioritized at least one radio access technology is accepted by the associated wireless network.

3. The method of claim 2, further comprising:
   performing data communication based on the prioritized at least one radio access technology and in accordance with the downlink control signaling.

4. The method of claim 1, further comprising:
   performing cell measurements in accordance with the received downlink control signaling.

5. The method of claim 4, wherein the cell measurements are performed based on the prioritized at least one radio access technology, upon the prioritized at least one radio access technology being acknowledged.

6. The method of claim 4, wherein the cell measurements are performed based on the plurality of radio access technologies supported by the user equipment, upon the prioritized at least one radio access technology not being acknowledged.

7. The method of claim 4, further comprising:
   receiving further downlink control signaling,
   wherein the further downlink control signaling comprises override data, that induces an adaption of whether the cell measurements are performed based on the prioritized at least one radio access technology or based on the plurality of radio access technologies.

8. The method of claim 1, wherein prioritizing the at least one radio access technology supported by the user equipment is based on at least one of:
   an energy consumption;
   the network access state comprising one of: an idle network access state, an inactive network access state or an active network access state;
   a security level;
   a geolocation;
   a timing;
   a service type; or
   a quality of service.

9. The method of claim 8, wherein the uplink control signaling is indicative of the at least one or more of the energy consumption, the network access state, the security level, the geolocation, the timing, the service type and/or the quality of service.

10. The method of claim 1, wherein the uplink control signaling is included in one or more of a user equipment capability signaling; a user equipment uplink control signal; and/or a RRC configuration message.

11. The method of claim 1, wherein the uplink control signaling comprises a list of at least one radio access technology that is not prioritized.

12. The method of claim 1, wherein said prioritizing of the at least one radio access technology based on the network access state of the user equipment with the associated network is performed differently for at least two of a) an idle network access state, b) an inactive network access state and c) an active network access state of the user equipment.

13. A method for use in a network node of a wireless network connectable with an associated user equipment that is adapted to communicate with the wireless network using a plurality of radio access technologies supported by the associated user equipment, the method comprising:
receiving, from the associated user equipment, uplink control signaling indicative of at least one prioritized radio access technology prioritized from the plurality of radio access technologies supported by the associated user equipment based on a mode of operation of the associated user equipment; and
considering the at least one prioritized radio access technology when performing at least one network action associated with the associated user equipment.

14. The method of claim 13, wherein the at least one network action comprises accepting or not accepting the prioritized at least one radio access technology.

15. The method of claim 14, further comprising:
transmitting downlink control signaling to the associated user equipment in response to the uplink control signaling and indicative of whether the at least one prioritized radio access technology is accepted.

16. The method of claim 13, wherein the at least one network action comprises instructing the associated user equipment to perform cell measurements based on the at least one prioritized radio access technology.

17. The method of claim 13, wherein the at least one network action comprises allocating radio resources for communicating with the associated user equipment based on the at least one prioritized radio access technology.

18. The method of claim 13, further comprising:
transmitting further downlink control signaling comprising override data, that induces an adaption of whether cell measurements are performed based on the prioritized at least one radio access technology or based on the plurality of radio access technologies.

19. The method of claim 13, wherein the uplink control signaling is included in one or more of a user equipment capability signaling; a user equipment uplink control signal; and/or a RRC configuration message.

20. The method of claim 13, wherein the uplink control signaling comprises a list of at least one radio access technology that is not prioritized.

21. The method of claim 13, wherein the at least one network action comprises transmitting an inter-radio access technology handover command to a further network node.

22. The method of claim 1, further comprising:
activating the prioritized at least one radio access technology in accordance with received downlink control signaling; and
deactivating one or more of the radio access technologies supported by the user equipment other than the prioritized at least one radio access technology in accordance with the received downlink control signaling,
wherein the transmitted uplink control signaling is indicative of the one or more of the radio access technologies supported by the user equipment other than the prioritized at least one radio access technology desired by the user equipment to be deactivated.

23. The method of claim 13, wherein:
the receiving the uplink control signaling from the associated user equipment comprises receiving uplink control signaling indicative of one or more of the radio access technologies supported by the user equipment other than the prioritized at least one radio access technology desired by the user equipment to be deactivated; and
wherein the at least one network action comprises instructing the associated user equipment to:
activate the at least one prioritized radio access technology; and
deactivate the one or more of the radio access technologies supported by the user equipment other than the prioritized at least one radio access technology desired by the user equipment to be deactivated.

24. The method of claim 1, wherein:
the prioritizing the at least one radio access technology comprises:
automatically prioritizing the user equipment from among the plurality of radio access technologies; and
the transmitting the uplink control signaling comprises:
automatically transmitting the uplink control signaling to the associated wireless network.

* * * * *